Sept. 4, 1928. 1,683,397
J. F. O'CONNOR
FRICTION SHOCK ABSORBING MECHANISM
Filed Jan. 31, 1927 2 Sheets-Sheet 1
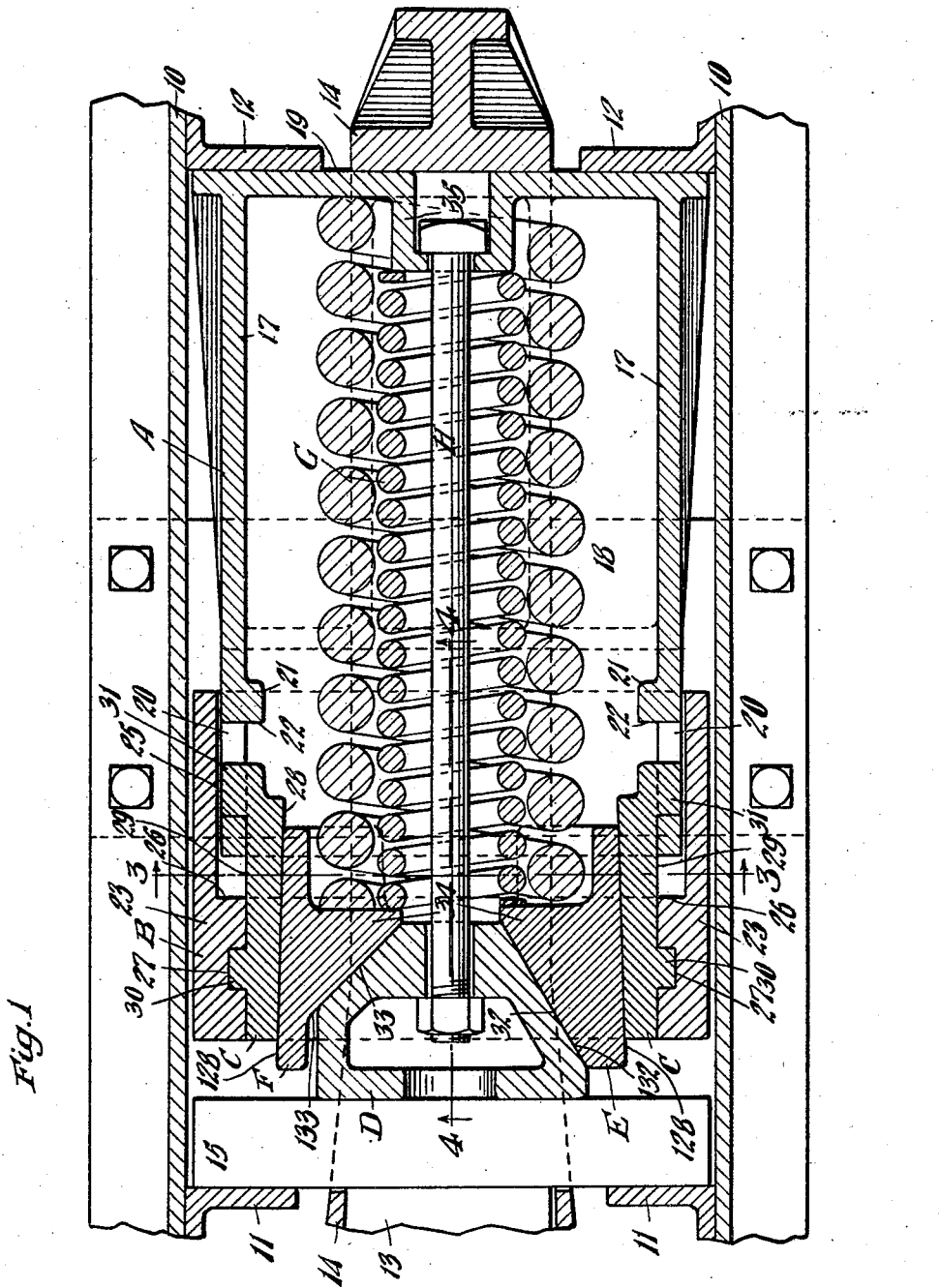
Witness
Wm. Geiger
Inventor
John F. O'Connor
By George I. Haight
His Atty.

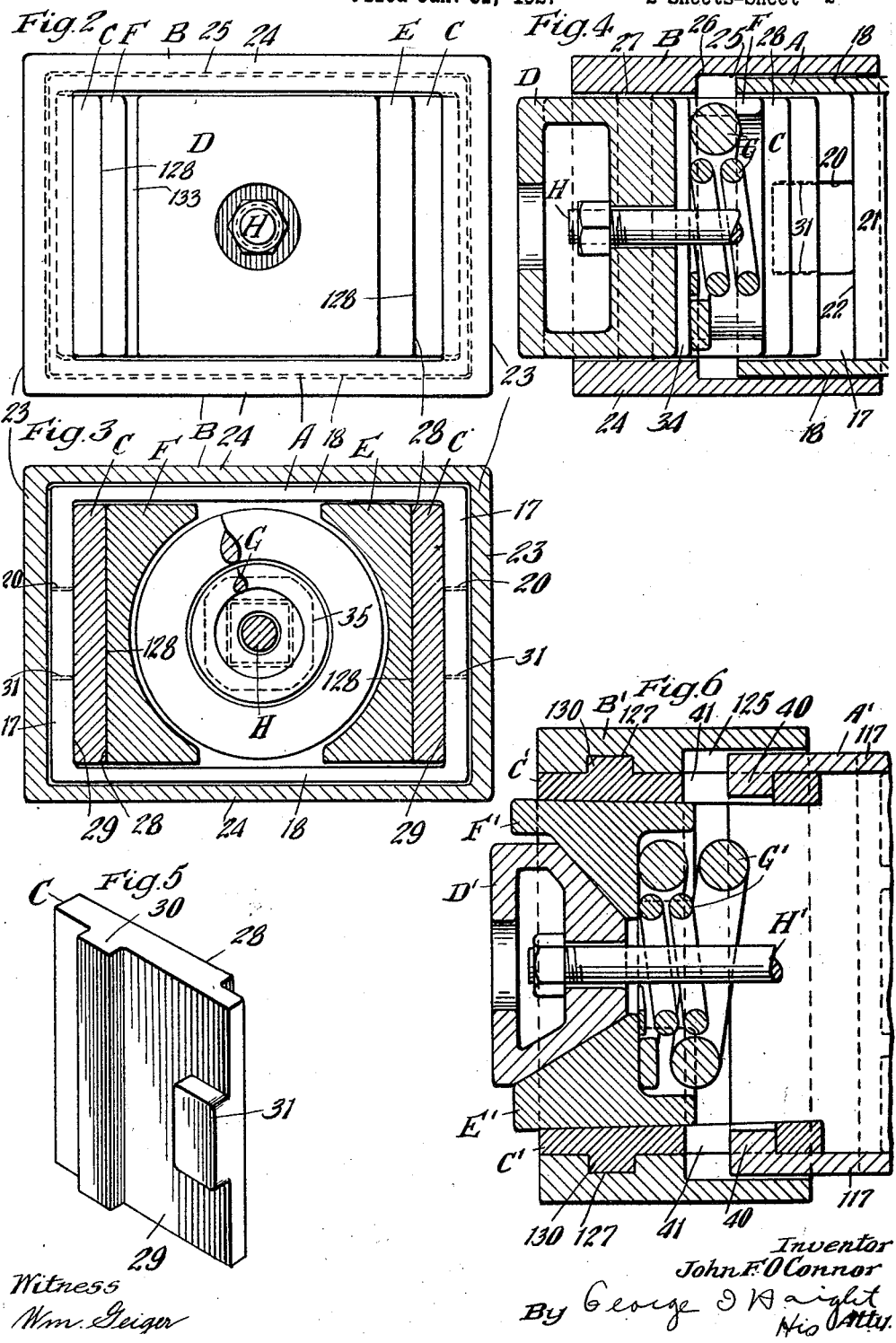

Patented Sept. 4, 1928.

1,683,397

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 31, 1927. Serial No. 164,834.

This invention relates to improvements in friction shock absorbing mechanisms.

One object of the invention is to provide a friction shock absorbing mechanism especially adapted for railway draft riggings, affording free spring action during the first part of the compression stroke to absorb the lighter shocks to which the mechanism is subjected, followed by frictional resistance during the remainder of the compression stroke to take care of the heavier shocks, including a spring cage and friction shell which are relatively movable to a limited extent during the first part of the compression stroke, and friction means relatively movable with respect to the shell during the remainder of the compression stroke to produce the heavier resistance; wherein simple and efficient readily renewable means having friction surfaces is provided for anchoring the friction shell to the cage, whereby the friction surfaces of the shell may be renewed when worn without destructive effect to the shell.

A more specific object of the invention is to provide, in a mechanism of the character indicated, including a spring cage and a relatively movable friction shell, wherein the friction surfaces of the shell may be readily renewed when they become worn by the provision of detachable liners for the shell which also serve to anchor the shell to the cage for limited movement relatively thereto, thereby greatly reducing the cost of manufacture of the shock absorbing mechanism and adding materially to the length of service of the same.

Other objects and advantages of the invention will more fully and clearly appear from the description and claims hereinafter following.

In the drawings, forming a part of this specification, Figure 1 is a horizontal longitudinal sectional view of a portion of a railway draft rigging, showing one embodiment of my improvements in connection therewith. Figure 2 is a front end elevational view of my improved shock absorbing mechanism illustrated in Figure 1. Figure 3 is a transverse vertical sectional view corresponding substantially to the line 3—3 of Figure 1. Figure 4 is a longitudinal vertical sectional view of the shock absorbing mechanism proper illustrated in Figure 1, corresponding substantially to the line 4—4 of said figure. Figure 5 is a detailed perspective view of a liner employed in connection with my improved shock absorbing mechanism as illustrated in Figures 1 to 4, inclusive, and Figure 6 is a horizontal sectional view of the front end portion of my improved shock absorbing mechanism, illustrating another embodiment of the invention.

In said drawings, 10—10 indicate channel shaped center or draft sills of a railway car underframe, to the inner surfaces of which are secured the usual front stop lugs 11—11 and rear stop lugs 12—12. The inner end portion of the draw-bar is designated by 13, to which is operatively connected a yoke 14 of well known form. The shock absorbing mechanism proper and the front main follower 15 are disposed within the yoke and the yoke and the parts therewithin are supported in operative position by a detachable saddle plate 16 fixed to the draft sills.

Referring first to the embodiment of the invention illustrated in Figures 1 to 5, inclusive, the improved shock absorbing mechanism proper comprises broadly: A spring cage A; a friction shell B; a pair of liners C—C; a wedge D; a pair of friction shoes E and F; a main spring resistance G; and a retainer bolt H.

The spring cage is in the form of a substantially rectangular box-like casting having longitudinally disposed vertical spaced side walls 17—17, horizontally disposed longitudinally extending spaced top and bottom walls 18—18, and a vertical rear end wall 19. The end wall 19 cooperates with the stop lugs 12 in the manner of the usual rear follower. The side walls 17 are longitudinally slotted adjacent the forward end as indicated at 20. The slots 20 in the opposite side walls are preferably disposed in alignment. Rearwardly of the slots 20, the side walls of the cage are laterally enlarged as indicated at 21—21, thereby presenting relatively wide abutment faces 22—22 at the inner ends of the slots 20.

The friction shell B is also in the form of a substantially rectangular box-like casting open at its front and rear ends and having vertically disposed longitudinally extending spaced side walls 23—23 and horizontally disposed longitudinally extending spaced top and bottom walls 24—24. The top, bottom and side walls are interiorly cut away at the rear end of the shell as indicated at 25 to telescopically receive the front end portion of the spring cage A. The front end portion of the top, bottom and side walls of the shell B are thus left enlarged, thereby presenting transverse shoulders 26 adapted to co-operate with the front end of the spring cage to limit inward movement of the shell relatively thereto. The enlarged portions of the side walls 23 of the friction shell are vertically slotted as indicated at 27 for a purpose hereinafter set forth.

The liners C are disposed at opposite sides of the mechanism and are detachably connected to the side walls 23 of the friction shell B. Each of the liners C is in the form of a relatively heavy substantially rectangular plate having the longitudinally disposed friction surface 28 on the inner side thereof. The friction surface 28 of the opposed liners are preferably converged inwardly of the shell to produce differential action. On the outer side, each liner C is provided with a flat bearing surface 29 adapted to engage the inner surface of the side wall 23 of the shell B. Each liner C is also provided with a relatively wide vertical rib 30 on the outer side thereof adapted to engage within the slot 27 of the corresponding side wall 23 of the friction shell B, thereby anchoring the liner against longitudinal displacement with respect to the shell proper. At the rear end, each liner C is provided with a laterally extending lug 31 on the outer side thereof. The lug 31 of each liner is engaged within the slot 20 on the corresponding side wall 17 of the spring cage. The lugs 31 and the slots 20 are so proportioned that the rear ends of the lugs will engage the shoulders 22 at the same time that movement of the shell B is limited by engagement with the shoulders 26 thereof with the front end of the spring cage A. As will be evident, the lugs 31 of the liners serve to anchor the friction shell B to the spring cage for limited movement relative thereto. Outward movement of the shell B with respect to the cage A is limited by engagement of the lugs 31 with the front end walls of the slots 20 in the side walls of the cage.

The wedge D is in the form of a cored block having a flat front end face bearing directly on the inner side of the main follower 15. At the inner end, the wedge block D is provided with a pair of inwardly converging wedge faces on opposite sides thereof, the wedge faces being designated by 32 and 33 respectively. The wedge face 32 is shown as disposed at a relatively keen wedge acting angle with respect to the longitudinal axis of the mechanism while the wedge face 33 is shown as disposed at a relatively blunt angle with respect to said axis. Although the wedge faces are shown as disposed at different angles with respect to the axis of the mechanism, it will be evident that they may be disposed at the same angle with respect thereto.

The friction shoes E and F are disposed at opposite sides of the mechanism and are interposed between the wedge block and the liners C. The friction shoes E and F are of like design, except as hereinafter pointed out. Each of the shoes is provided with an outer longitudinally disposed flat friction surface 128 adapted to co-operate with the friction surface 28 of the corresponding liner C. On the inner side, each shoe is provided with a lateral enlargement 34 having a wedge face at the forward side thereof, the wedge face of the shoe E being designated by 132 and co-operating with the wedge face 32 of the block D and correspondingly inclined thereto, and the wedge face on the shoe F being designated by 133 and co-operating with the wedge face 33 of the block D and correspondingly inclined thereto.

The spring resistance G comprises a relatively light inner coil and a heavier outer coil, both coils having their forward ends bearing directly on the inner ends of the enlargements of the friction shoes and the outer coil having the rear end thereof bearing on the end wall 19 of the cage A. The inner coil has the rear end thereof bearing on an inwardly projecting hollow boss 35 on the end wall 19 of the cage A.

The mechanism is held assembled and of overall uniform length by the retainer bolt H which has its opposite ends anchored to the hollow boss 35 and the wedge block D respectively. The retainer bolt H not only serves to hold the mechanism assembled, but also to maintain the spring resistance under initial compression. Compensation for wear of the various friction wedge faces is had by outward movement of the friction shoes with respect to the other parts, the shoes being urged outwardly by the spring resistance G, which, as hereinbefore pointed out, is maintained under initial compression. In assembling the mechanism, and connecting the friction shell B to the cage A, the liners C are inserted within the cage, while the shell B is telescoped over the end of the cage, the lugs 31 of the liners being inserted in the slots 20 and the ribs 30 being forced into the slots 27 of the friction shell B. The wedge, friction shoes and spring are then assembled with the friction shell and cage, and the parts secured in position by the retainer bolt H. It will be evident that due to the spring G being under initial compression, the wedge block D acts to maintain the friction shoes spread apart and under lateral pressure. Due to this lateral pressure, the liners C will be held assembled with the friction shell B and spring cage A. In case the liners become worn, the same may be readily replaced by new liners by removing the wedge and friction shoes from the gear, then detaching the liners C and replacing the same by new liners, the gear being then assembled in the manner hereinbefore pointed out.

The operation of my improved shock absorbing mechanism, as illustrated in Figures 1 to 5, inclusive, assuming a compression stroke, is as follows: The spring cage A and follower 15 will be moved relatively toward each other, thereby forcing the wedge block D toward the spring cage A and carrying the shoes E and F inwardly of the mechanism also and forcing the same laterally against the liners C. Due to the friction thus created between the friction shoes and the liners, the latter will be forced to move inwardly of the mechanism in unison with the shoes, carrying the friction shell B to which they are fixedly anchored therewith. Movement of the friction shell in unison with the friction shoes and wedge is limited by engagement of the shoulders 26 of the shell B with the front end of the spring cage A and engagement of the lugs 31 on the liners with the shoulders 22 of the spring cage. Further movement of the friction shell with respect to the spring cage is thus positively prevented, and the friction shoes are forced to slide on the liners during the remainder of the compression stroke. It will be evident that movement of the parts during the first portion of the compression stroke is resisted entirely by the spring G, and that after movement of the friction shell B with respect to the cage A is arrested, movement of the follower with respect to the cage A is resisted by the friction created between the shoes and the liners in addition to the resistance offered by the spring G.

During release, when the actuating force is reduced, the spring resistance H will force the shoes and wedge block outwardly carrying the friction shell B therewith due to the friction existing between the liners C and the friction shoes E and F. Outward movement of the shell B will be arrested by engagement of the lugs 31 on the liners with the front end walls of the slots 20 of the cage. Due to the further expansion of the spring G, the shoes E and F, together with the wedge, will be forced outwardly with respect to the shell B until further movement thereof is limited by the retainer bolt H. The parts will then be in the normal position illustrated in Figure 1.

Referring next to the embodiment of the invention illustrated in Figure 6, the same comprises: A spring cage A'; a friction shell B'; liners C'; friction shoes E' and F'; a wedge block D'; a main spring resistance G'; and a retainer bolt H'.

The wedge block D', friction shoes E' and F', the main spring resistance G' and the retainer bolt H' are all of substantially the same construction as the corresponding parts illustrated in the embodiment of the invention in Figures 1 to 5, inclusive, and function in a similar manner. The spring cage A' is of generally the same construction as the cage A hereinbefore described, differing therefrom only in that the side walls 117 thereof are provided with a pair of lugs 40 at the forward end, engaging within slots 41—41 on the liners C'.

The friction shell B' is also generally the same as the friction shell B, being provided with a slot 127 adapted to receive a rib 130 on the corresponding liner C', and being interiorly cut away as indicated at 125 to telescopically receive the forward end of the cage A'.

The liners C' are held to the friction shell B' by the ribs 130 in a manner similar to the corresponding parts illustrated in Figures 1 to 5, inclusive. The lost motion connection between the liners C' and the spring cage A' is provided by the lugs 40 which engage within the slots 41 at the rear ends of the liners and the friction shell B' is thus anchored to the spring cage A' and limited in its movement outwardly of the cage.

The operation of the improved shock absorbing mechanism as illustrated in Figure 6, is substantially identical with that of the form of the invention disclosed in Figures 1 to 5, inclusive.

Although the friction shell and spring cage may be formed of any suitable material, I preferably form both the spring cage and friction shell of steel so as to prolong the life of the gear.

From the preceding description taken in connection with the drawings, it will be evident that I have provided simple and efficient means which may be cheaply manufactured in the form of replaceable liners for connecting the friction shell to the spring cage of a shock absorbing mechanism. By this arrangement, the life of the shock absorbing mechanism proper is greatly prolonged, inasmuch as the liners may be repeatedly replaced by new liners as they become worn.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage less than the full compression stroke of the mechanism; of a friction shell, said shell and cage being relatively movable; removable means for lining said shell, said removable means being anchored to the spring cage, said anchorage providing for limited longitudinal movement between the shell and cage; friction means co-operating with the lining means of the shell; and spring resistance means opposing movement of the shell and friction means inwardly of the cage.

2. In a friction shock absorbing mechanism, the combination with a spring cage; of a friction shell, said shell being provided with removable liners presenting interior friction surfaces; co-operating means on said liners and cage for anchoring the shell to the cage for limited movement relative thereto before full compression of the mechanism; friction means co-operating with the friction surfaces of the liners; and means within the cage for yieldingly opposing movement of the shell and friction means inwardly of the cage.

3. In a friction shock absorbing mechanism, the combination with a spring cage; of a friction shell having opposed walls; a liner removably attached to each of said walls, said liner having longitudinally disposed friction surfaces, said liners and cage having co-operating means thereon for anchoring the shell to the cage for limited relative movement thereof, after a predetermined compression of the mechanism less than the full compression stroke; friction shoes engaging the friction surfaces of the liners; spreading means engaging the shoes; and spring resistance means within the cage opposing movement of the shoes and shell inwardly of the cage.

4. In a friction shock absorbing mechanism, the combination with a spring cage; of a rectangular friction shell having opposed side walls; of a pair of liners removably secured to the side walls of the shell, said liners having longitudinally disposed friction surfaces, said liners having a lost motion connection with the cage for detachably connecting the shell to the cage for limited relative movement thereof to less than the full compression stroke of the mechanism; friction shoes co-operating with the liners; pressure transmitting means having wedging engagement with the shoes, and means within the cage yieldingly opposing movement of the shell and shoes toward the cage.

5. In a friction shock absorbing mechanism, the combination with a spring cage; of a friction shell; liners for the shell, said liners and shell having shouldered engagement to detachably secure the liners to the shell and hold the same against relative longitudinal movement; interengaging means on the liners and cage providing a lost motion connection for anchoring the shell to the cage for limited relative movement thereto less than the full compression stroke of the mechanism; friction shoes bearing on the liners; pressure transmitting wedge means movable relatively to the cage for spreading the shoes apart to place the liners under lateral pressure and maintain the same in assembled relation with the shell; and spring resistance means within the cage opposing relative movement of the shell and cage and also opposing relative movement of the cage and shoes.

6. In a friction shock absorbing mechanism, the combination with a spring cage; of a friction shell, said cage and shell having limited movement toward and away from each other, said shell being provided with liners detachably fixed thereto, said liners presenting interior friction surfaces; interengaging lug and slot connections on said liners and cage for anchoring the shell to the cage and limiting relative movement of the shell and cage to less than the full compression stroke of the mechanism; friction means cooperating with said liners; means for moving said friction means and cage relatively to each other and forcing the friction means laterally outwardly against the liners; and spring means within the cage opposing movement of the shell and friction means inwardly of the cage.

7. In a friction shock absorbing mechanism, the combination with a spring cage; of a friction shell, said shell and cage being telescoped and having relative movement limited to less than the full compression stroke of the mechanism; of means for anchoring the shell to the cage for limited relative movement including liners detachably fixed to the shell and having a lost motion connection with the cage; friction shoes engaging the liners; pressure transmitting spreading means for holding said shoes against the liners and the liners fixed to the shell; and a spring resistance within the cage opposing the movement of the shell toward the cage.

8. In a friction shock absorbing mechanism, the combination with a spring cage; of a friction shell telescopically receiving the front end of the cage; liners detachably anchored to the shell against longitudinal movement, said liners having a lost motion connection with the cage for anchoring the same to the cage for limited movement longitudinally thereof during the first part of the compression stroke; friction means co-operating with the liners; pressure transmitting spreading means for forcing said shoes apart, placing the liners under lateral pressure and holding the same against the shell walls; and spring resistance means within the shell co-operating with said shoes.

9. In a friction shock absorbing mechanism, the combination with a spring cage; of a friction shell having opposed side walls, said shell and cage being relatively movable toward and away from each other; detachable liners anchored to the shell wall for movement in unison with the shell, said liners and cage having a lost motion connection for anchoring the shell to the cage for limited relative movement less than the full compression stroke of the mechanism, said lost motion connection including lugs on the liners engaging within slots in the cage walls;

friction elements co-operating with the liners; pressure transmitting spreading means co-operating with said friction elements for forcing the same apart and moving them inward of the mechanism; and spring resistance means within the cage opposing movement of said shell and friction means inwardly of the cage.

10. In a friction shock absorbing mechanism, the combination with a spring cage; of a friction shell, said cage and shell having relative movement toward and away from each other; means on the cage for arresting inward movement of the shell after a predetermined compression of the mechanism less than the full compression stroke; liners fixedly anchored to the shell, said liners having longitudinally disposed friction surfaces; interengaging lug and slot lost motion connections on said liners and cage for anchoring the shell to the cage and limiting outward movement of the shell; friction shoes co-operating with the liners; pressure transmitting means having wedging engagement with the shoes; and a spring resistance within the cage opposing movement of the shell and shoes.

11. In a friction shock absorbing mechanism, the combination with a spring cage; of a friction shell, said shell and cage having limited relative movement longitudinally of the mechanism less than the full compression stroke; said shell having a lost motion connection with the cage, including arms fixed to the shell, said arms and cage having interengaging slot and lug connections; friction means co-operating with the friction shell; pressure transmitting spreading means for placing said friction means under lateral pressure and forcing the same inwardly of the mechanism; and a spring resistance within the cage opposing movement of the shell and friction means inwardly of the cage.

12. In a friction shock absorbing mechanism, the combination with a spring cage; of a movable friction shell; removable means for lining said shell, said removable means being anchored to the spring cage and shell to maintain the same assembled, said removable means providing a lost motion connection limiting movement of the shell to less than the full compression stroke of the mechanism; friction means co-operating with the lining means of the shell; spreading means co-operating with the friction means for pressing the friction means outwardly against the lining means of the shell to maintain the lining means interlocked with the shell and spring cage; and spring resistance means opposing relative movement of the spring cage and friction means.

In witness that I claim the foregoing I have hereunto subscribed my name this 28th day of January, 1927.

JOHN F. O'CONNOR.